US008329820B2

(12) United States Patent
Hu et al.

(10) Patent No.: US 8,329,820 B2
(45) Date of Patent: Dec. 11, 2012

(54) FIRE-RESISTANT COATING MATERIAL

(75) Inventors: Chih-Ming Hu, Kaohsiung (TW); Yung-Hsing Huang, Taipei (TW); Che I Kao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 464 days.

(21) Appl. No.: 11/642,634

(22) Filed: Dec. 21, 2006

(65) Prior Publication Data

US 2007/0149676 A1 Jun. 28, 2007

Related U.S. Application Data

(63) Continuation-in-part of application No. 11/410,913, filed on Apr. 26, 2006, now abandoned.

(30) Foreign Application Priority Data

Dec. 26, 2005 (TW) ................................ 94146508 A

(51) Int. Cl.
*C08G 18/22* (2006.01)
*C08G 18/10* (2006.01)
*C08G 18/28* (2006.01)

(52) U.S. Cl. ......... 525/123; 525/369; 524/436; 524/437

(58) Field of Classification Search .................. 524/436, 524/437; 525/369
See application file for complete search history.

(56) References Cited

U.S. PATENT DOCUMENTS 3,714,047 A * 1/1973 Marion et al. .................. 252/62
4,150,207 A * 4/1979 Cenker et al. ................. 521/174
4,376,840 A * 3/1983 Moriwaki et al. ............ 524/779
4,748,195 A 5/1988 Hackl et al.
4,876,291 A * 10/1989 Dallavia et al. ............... 521/124
5,218,027 A 6/1993 Smith et al.
5,418,272 A * 5/1995 Kawabata et al. ............ 524/436
5,670,748 A 9/1997 Gingue et al.
5,723,515 A 3/1998 Gottfried
5,853,809 A * 12/1998 Campbell et al. .......... 427/407.1
6,020,419 A * 2/2000 Bock et al. .................... 524/590
6,262,161 B1 7/2001 Betso et al.
6,599,631 B2 * 7/2003 Kambe et al. ................. 428/447
6,646,205 B2 * 11/2003 Hase et al. ................ 174/110 R (Continued)

FOREIGN PATENT DOCUMENTS

CN 1262698 A 8/2000

(Continued)

OTHER PUBLICATIONS

JP 09059509A, Mar. 1997, Machine Translation.*

(Continued)

*Primary Examiner* — Satya Sastri
(74) *Attorney, Agent, or Firm* — Birch, Stewart, Kolasch & Birch, LLP

(57) ABSTRACT

A fire-resistant coating material comprising an organic/inorganic composite is disclosed. The organic/inorganic composite includes an organic component of polymer, monomer, oligomer, prepolymer, or copolymer having a first reactive functional group; inorganic particles; and optional additives. The inorganic particles possess a second reactive functional group, originally or after surface modification, which react with the first reactive functional group of the organic component to form chemical bonds. The organic/inorganic composite can be with admixed with a suitable continuous phase, depending on the type of the organic component, to provide a fire-resistant coating material.

16 Claims, 2 Drawing Sheets

U.S. PATENT DOCUMENTS

| | | | | |
|---|---|---|---|---|
| 6,815,489 | B1 | 11/2004 | Fischer et al. | |
| 7,053,145 | B1 | 5/2006 | Tasaka et al. | |
| 2004/0054035 | A1 | 3/2004 | Hallissy et al. | |
| 2006/0014880 | A1 * | 1/2006 | Zhong et al. | 524/451 |
| 2006/0036006 | A1 | 2/2006 | Heschke et al. | |
| 2007/0149675 | A1 * | 6/2007 | Huang et al. | 524/425 |
| 2007/0149676 | A1 | 6/2007 | Hu et al. | |
| 2007/0149677 | A1 * | 6/2007 | Huang et al. | 524/425 |
| 2007/0179235 | A1 * | 8/2007 | Huang et al. | 524/425 |

FOREIGN PATENT DOCUMENTS

| | | | |
|---|---|---|---|
| CN | 1341141 | A | 3/2002 |
| DE | 2854898 | A * | 6/1980 |
| DE | 2854898 | A1 | 6/1980 |
| DE | DD237758 | A * | 7/1986 |
| DE | 19941181 | A1 | 5/2000 |
| EP | 1 100 093 | A3 | 5/2001 |
| EP | 1 215 238 | A1 | 6/2002 |
| EP | 1 215 685 | A1 | 6/2002 |
| EP | 1384752 | A1 | 1/2004 |
| EP | 1457523 | A1 | 9/2004 |
| JP | 47-44351 | | 11/1972 |
| JP | 51022799 | A * | 2/1976 |
| JP | 57-92037 | A | 6/1982 |
| JP | 59-42779 | A | 3/1984 |
| JP | 61-272222 | A | 12/1986 |
| JP | 62-201934 | A | 9/1987 |
| JP | 2-210717 | A | 8/1990 |
| JP | 02202907 | A * | 8/1990 |
| JP | 4-55454 | A | 2/1992 |
| JP | 04202587 | A * | 7/1992 |
| JP | 5-239281 | A | 9/1993 |
| JP | 08113682 | A | 5/1996 |
| JP | 09059509 | A * | 3/1997 |
| JP | 9-204824 | A | 8/1997 |
| JP | 10029278 | A | 2/1998 |
| JP | 10-120948 | A | 5/1998 |
| JP | 10147707 | A * | 6/1998 |
| JP | 10-245456 | A | 9/1998 |
| JP | 11080538 | A * | 3/1999 |
| JP | 11-306873 | A | 11/1999 |
| JP | 11-310720 | A | 11/1999 |
| JP | 2001-2840 | A | 1/2001 |
| JP | 2002-179857 | A | 6/2002 |
| JP | 2002-324442 | A | 11/2002 |
| JP | 2003-96306 | A | 4/2003 |
| JP | 2004254407 | A * | 9/2004 |
| JP | 2005-60675 | A | 3/2005 |
| JP | 2005-162931 | A | 6/2005 |
| JP | 2005-213480 | A | 8/2005 |
| JP | 2005-232264 | A | 9/2005 |
| TW | 442549 | | 9/1987 |
| TW | 397885 | | 7/1988 |
| TW | 499469 | | 2/1989 |
| TW | 583078 | | 6/1990 |
| TW | 419514 | | 1/2001 |
| TW | 200415235 | A | 8/2004 |
| TW | 263628 | | 10/2006 |
| WO | WO-99/27015 | A1 | 6/1999 |
| WO | 2004/035711 | A1 | 4/2004 |

OTHER PUBLICATIONS

JP 04202587 A, Takahashi et al., Jul. 1992, Derwent Ab.*
JP 11080538 A, Machine translation, Kumasaka, Mar. 1999.*
DD237758A, Derwent AB., Behrendt et al., Jul. 1986.*
JP 02202907 A, Aug. 1990, English Translation.*
JP 10147707 A, Jun. 1998, Machine translation.*
JP 51022799 A, Feb. 1976, English Translation.*
DE2854898A, Jun. 1980, English Translation.*
JP 2004254407 A, Sep. 2004, English Translation.*
Office Action dated Jan. 27, 2011 for Taiwanese Application No. 095148155.
CN Office Action, Appl. No. 200610171789.2, Feb. 10, 2011, pp. 1-5.
CN Office Action, Appl. No. 200610171790.5, Mar. 3, 2011, pp. 1-3.
Finnish Office Action dated Jan. 3, 2011 for Finnish Application No. 20070484.
Japanese Office Action dated Apr. 12, 2011 for Japanese Application No. 2006-348596.
Taiwanese Notice of Allowance dated Apr. 27, 2011 for Taiwanese Application No. 095148155.
Japanese Office Action, Appl. No. 2006-348595, Aug. 30, 2011, pp. 1-2 (w/ English translation).
Chinese Office Action, Appl. No. 200610171789.2, Oct. 29, 2010, pp. 1-4.
German Examination Report, Appl. No. 102006062148.4-43; Sep. 28, 2010, pp. 1-4 (w/ full English translation).
German Office Action, Application No. 10 2006 062 146.8-43, Sep. 28, 2010, pp. 1-4 (w/ English translation).
German Office Action, Application No. 10 2006 062 147.6-34, Nov. 4, 2010, pp. 1-3 (w/ English translation).
Japanese Office Action, Application No. 2006-348595, Nov. 30, 2010, pp. 1-2 (w/ English translation).
USPTO Office Action dated Nov. 7, 2011 for U.S. Appl. No. 11/642,646.

* cited by examiner

FIRE-RESISTANT COATING MATERIAL

CROSS-REFERENCE TO RELATED APPLICATIONS

This application is a Continuation-In-Part of application Ser. No. 11/410,913, filed on Apr. 26, 2006 now abandoned, which claims priority to Taiwan Patent Application no. 94146503, filed on Dec. 26, 2005.

BACKGROUND OF THE INVENTION

1. Field of the Invention

The invention relates to an organic polymer/inorganic particle composite, and in particular to a fire-resistant coating material containing the organic/inorganic composite.

2. Description of the Related Art

Fire resistant or fire retardant materials can be used as architectural or decorative materials. Architectural materials disclosed in Taiwan Patent Nos. 583,078 and 397,885 primarily comprise a stacked layer, serving as a fire resistant layer, made of nonflammable inorganic materials such as pearlite (or perlite), $MgCl_2$, MgO, $CaCO_3$ or cement. In addition, a stiff fire resistant laminate can be obtained from flexible substrates made of fibers or non-wovens blended with flame retardants, foaming agents and 50~80 inorganic materials by weight.

Fire resistant coatings, serving as decorative materials, disclosed in Taiwan Patent Nos. 442,549, 499,469 and 419,514 comprise a combination of foaming and intumescent agents, carbonization agents, flame retardants, and adhesives which foam and intumesce under fire exposure. U.S. Pat. No. 5,723,515 discloses a fire-retardant coating material including a fluid intumescent base material having a foaming agent, a blowing agent, a charring agent, a binding agent, a solvent, and a pigment, for increasing resistance to cracking and shrinking. A compound disclosed by U.S. Pat. No. 5,218,027 is manufactured from a composition of a copolymer or terpolymer, a low modulus polymer, and a synthetic hydrocarbon elastomer. The fire retardant additive comprising a group I, group II or group III metal hydroxide with the proviso that at least 1% by weight of the composition is in the form of an organopolysiloxane. U.S. Pat. No. 6,262,161 relates to filled interpolymer compositions of ethylene and/or alpha-olefin/vinyl or vinylidene monomers, showing improved performance under exposure to flame or ignition sources, and fabricated articles thereof. The articles are often in the form of a film, sheet, a multilayered structure, a floor, wall, or ceiling covering, foams, fibers, electrical devices, or wire and cable assemblies. Conventional flame retardant polymer compositions are obtained by physical bending of organic polymer and inorganic flame retardant, wherein coupling agents or surfactants are typically incorporated to improve the dispersity of inorganic flame retardant. However, because the organic polymer does not react with inorganic component to form a well-structured composite by the formation of chemical bonds, the conventional flame retardant compositions easily melt, ignite, or produce flaming drops under exposure to flame or ignition sources.

BRIEF SUMMARY OF THE INVENTION

A general object of the invention is to provide a fire-resistant coating material having superior fire resistant and fire retardant properties.

To achieve the above and other objects, the fire-resistant coating material of the invention comprises an organic/inorganic composite comprising an organic component having a first reactive functional group, the organic component comprising polymer, copolymer, monomer, oligomer, or prepolymer; inorganic particles having a second reactive functional group; wherein the inorganic particles are chemically bonded to the organic component via a reaction between the first and second reactive functional groups.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
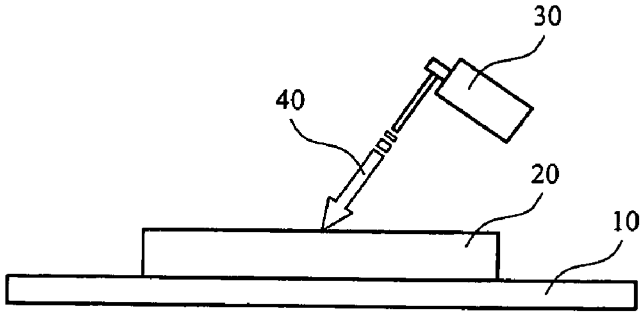
FIG. 1 is a schematic figure demonstrating the flame test for the fire-resistant coating of Example 1.

The following description is of the best-contemplated mode of carrying out the invention. This description is made for the purpose of illustrating the general principles of the invention and should not be taken in a limiting sense. The scope of the invention is best determined by reference to the appended claims.

In the invention, inorganic particles having reactive functional groups, originally or after surface modification, are well dispersed in and reacted with an organic component such as polymer, monomer, oligomer, prepolymer, or copolymer to enhance the fire retardant and mechanical properties. As a well-structured composite is provided by the formation of chemical bonds, the char layer formed on the surface is firm and can maintain its structural integrity without peeling or cracking, effectively preventing direct heat transfer to the interior. The organic/inorganic composite can be with admixed with a suitable continuous phase, depending on the type of organic component, to provide a fire-resistant coating material. In general, the organic/inorganic composite may comprise 10-90% by weight of the organic component, and 90-10% by weight of the inorganic particles. Preferably, the organic/inorganic composite comprises 30-70% by weight of the organic component, and 70-30% by weight of the inorganic particles, and more preferably comprises 40-60% by weight of the organic component, and 60-40% by weight of the inorganic particles.

The form of the fire-resistant coating material of the invention is slurry. The organic component in the coating material can be polymer, monomer, oligomer, prepolymer, or copolymer, while the organic component in a solidified coating can be oligomer, polymer, or copolymer. For the purposes of the invention, the term "polymer" refers to compounds having number average molecular weights in the range of 1500 to over 1,00,000 Daltons, while "oligomer" refers to compounds having number average molecular weights in the range of 200 to 1499 Daltons.

In the organic/inorganic composite, the organic component and the inorganic particles are chemically bonded via reactions of corresponding reactive functional groups. The reactive functional groups of the organic component and inorganic particles include, but are not limited to, —OH, —COOH, —NCO, $—NH_3$, $—NH_2$, —NH, and epoxy groups. For example, an organic component having —COOH or —NCO groups (e.g., organic acid or reactive polyurethane) can be employed to react with inorganic particles having —OH groups (e.g., metal hydroxide). In addition, an organic component having epoxy groups can be employed to react with inorganic particles having —$NH_2$ groups. Alternatively, an organic component having —OH groups (e.g., polyvinyl alcohol) may react with inorganic particles having —COOH or —NCO groups, and an organic component having —$NH_2$ groups may react with inorganic particles having epoxy groups.

The organic component suitable for use herein can include any monomer, oligomer, monopolymer, copolymer, or prepolymer that contains the above-mentioned reactive functional groups. The reactive functional groups may reside in the backbone or a side chain of the polymer. Preferred organic components include polyorganic acid, polyurethane, epoxy, polyolefin, and polyamine. The polyorganic acid includes momopolymers or copolymers that contain carboxylic or sulfonic acids such as poly(ethylene-co-acrylic acid and poly (acrylic acid-co-maleic acid). Illustrative examples of epoxy include bis(3,4-epoxy-6-methylcyclohexylmethyl) adipate, vinylcyclohexene dioxide, diglycidyl tetrahydrophthalate, diglycidyl hexahydrophthalate, bis(2,3-epoxycyclopentyl) ether resin, glycidyl ethers of polyphenol epoxy resin. The polyamine suitable for use include polyamine and polyimide. Illustrative examples of polyamine include nylon 6 ($(NH(CH_2)_5CO)_n$), nylon 66 ($(H(CH_2)_6$—NH—$CO(CH_2)_4CO)_n$), and nylon 12 ($(NH(CH_2)_{11}CO)_n$). The polyimide includes diamine such as 4,4-oxydianiline, 1,4-bis(4-aminophenoxy) benzene, or 2,2-bis[4-(4-aminophenoxy)phenyl]propane; and also includes polyimide synthesized by the diamine and dianhydride such as oxydiphthalic anhydride, pyromellitic dianhydride, or benzophenone tetracarboxylic dianhydride. The polyolefin suitable for use includes copolymers of an olefin monomer and a monomer having the above reactive functional groups. It should be noted that the organic component also includes monomer, oligomer, copolymer and prepolymer of the above illustrative polymers. In addition, these organic components may be used alone or in an admixture of two or more.

The inorganic particles suitable for use herein are those having corresponding functional groups, originally or after surface modification, that can react with the functional groups of the organic component. The preferred inorganic particles include hydroxide, nitride, oxide, carbide, metal salt, and inorganic layered material. The hydroxide includes metal hydroxide such as $Al(OH)_3$ or $Mg(OH)_2$. The nitride includes, for example, BN and $Si_3N_4$. The carbide includes, for example, SiC. The metal salt includes, for example, $CaCO_3$. The inorganic layered material includes, for example, clay, talc, and layered double hydroxide (LDH), wherein the clay can be smectite clay, vermiculite, halloysite, sericite, saponite, montmorillonite, beidellite, nontronite, mica, or hectorite. The inorganic particles also can be used in an admixture of two or more. For example, a clay having reactive functional groups can be used in combination with metal hydroxide. Suitable inorganic particles include micro-sized particles and nano-sized particles. Nano-sized particles having diameters between 1 and 100 nm are particularly preferred because the smaller particle size the greater the surface area per unit weight.

The organic component and the inorganic particles can be directly mixed for reaction to form covalent or ionic bonds, or the reaction can be carried out in various solvates (e.g., water, ethanol, or methyl ethyl ketone). The reaction temperature is generally from room temperature to about 150•C and the reaction time may vary from 10 minutes to a few days, depending on utilized starting materials. The slurry product obtained from the reaction can be directly employed as a fire-resistant coating, but solvent or water may be added thereto depending on application methods of the coating material. For example, for embodiments containing polyorganic acid, water or alcohols (such as methanol or ethanol) may be added to reduce the viscosity of the coating material to facilitate spray coating or brush coating. For embodiments containing reactive polyurethane, a wide variety of solvent may be used to reduce the viscosity, including, for example, hexane, ketone (e.g., acetone, methyl ethyl ketone), ester (e.g., butyl ester), N,N-dimethyl acetamide (DMAC), N-methylpyrrolidone (NMP), or aromatic hydrocarbon solvents (e.g., benzene, xylene). Two or more kinds of solvents may be used in combination. Typically, a low-boiling point solvent (b.p. 60-90•C) can be used with a high-boiling point solvent (b.p. 100-150•C) to reduce the coating difficulty and improve the coating quality.

To formulate an aqueous coating material, the organic/inorganic composite can be incorporated with pigment (depending on desired color), water, thickener, defoaming agent, and surfactant for improving dispersity. The thickener includes, for example, starch, clay, and cellulose thickener. The defoaming agent is typically non-ionic surfactant such as HCK-8112 from HCK Chemicals Corp. The surfactant for improving dispersity can be ionic or non-ionic surfactant such as J678 from Johnson Polymer Corp., SINONATE 707SF from Sino Chemical Corp., or Brij56 from Aldrich Chemical Corp. To formulate a PU-based solvent type coating material, the organic/inorganic composite can be incorporated with pigment, solvent, resin, leveling agent for hand feel improvement, curing agent, silane or siloxane as curing aid, and other additives. The leveling agent is mostly surfactant such as BYK-354, 333, and 306 from BYK-Chemie Corp. The curing agent is mostly isocyanate such as toluene diisocyanate (TDI), methylene bisphenyl isocyanate (MDI), or hexamethylene diisocyanate (HDI). The most common curing aids are tetraethoxysilane (TEOS) and triethoxyvinylsilane (TEVS).

The fire-resistant coating material of the invention may be coated onto the surfaces of flammable or inflammable objects to improve fire resistance by any suitable methods. For example, it may be coated by brush coating, roller coating, blade coating, or spray coating. The spray coating includes, for example, hot spray coating, air spray coating, airless spray coating, air-mix-assistant spray coating, high-volume low-pressure spray coating, low-volume medium-pressure spray coating, and the like.

When the organic/inorganic composite of the invention is burned or exposed to fire, the polymer forms a char layer and the inorganic particles radiate absorbed heat. The inorganic particles also strengthen the mechanical properties of the structure through the reaction between inorganic and organic materials, so that the formed char layer remains firm and structural integrity thereof is preserved without peeling or cracking, effectively preventing direct transfer of heat to the interior of the coated object. The fire resistant material is not only flame retardant but also protective of internal materials. As a result, the duration of fire resistant ability is greatly improved. In preferred embodiments, the fire-resistant coating is capable of withstanding flame temperatures between 1000 and 1200 for more than 3 minutes. Because the organic component and the inorganic particles are chemically bonded (compared to the conventional physical bending products), the fire-resistant composite of the invention does not melt, ignite or produce flaming drops under exposure to flame or ignition sources.

The fire-resistant coating material of the invention has a wide range of applications. For example, it is suitable as fire-resistant material for coating indoor structures or structural steel. It can further be used as coating material for cable wraps, wire wraps, or foaming materials. The fire-resistant coating material can also be used on flammable objects in vehicles such as airplanes, ships, cars, and trains. Accordingly, those of ordinary skill in the art may incorporate various additives depending on the specific application. For example, flame retardant such as melamine phosphates, red phosphorus, and phosphorus-based flame retardant may be present to improve the flame retardancy. Silane (such as TEOS or TEVS) or siloxane may be present to strengthen structural integrity and facilitate curing. Glass sand and glass fiber may be present to improve the heat resistance and strengthen structural integrity. The amount of these additives is typically between 0.1 and 20 parts by weight, based on 100 parts by weight of the organic/inorganic composite.

EXAMPLE 1

10 g of poly(ethylene-co-acrylic acid) was charged in a reactor, preheated to melt at 80-120•C and then stirred at 300 rpm. 10.8 g of deionized water and 10.8 g of aqueous ammonia were added to the reactor, giving a white emulsion after stirring for 10 minutes. Subsequently, 10 g of aluminum hydroxide powder was added to the reactor, giving a white slurry after stirring for 10 minutes. As shown in FIG. 1, a 2 mm-thick slurry was coated on a piece of A4 size paper 10 and then placed in an oven, dried at 60•C for 60 minutes, 80•C for 60 minutes, 100•C for 60 minutes, 120•C for 30 minutes, 140•C for 30 minutes, 160•C for 30 minutes, 180•C for 30 minutes, and finally, molded at 200•C for 240 minutes.

A flame test was conducted on the surface of the sample layer 20 by butane gas torch 30 with flame temperature of 1000-1200 (flame 40) for 30 seconds to 3 minutes. The result of the burn on the piece of A4 size paper is summarized in Table 1. No scorching was observed on the piece of A4 size paper after heating for 30, 60 and 120 seconds, slight scorching was noticed after 180 seconds.

According to this example, the duration of fire resistant ability was more than 3 minutes because the strengthened sample layer, i.e. —COOH of poly(ethylene-co-acrylic acid), reacted with —OH of $Al(OH)_3$ to form chemical bonds rather than physical blending.

EXAMPLE 2

10 g of poly(ethylene-co-acrylic acid) was charged in a reactor, preheated to melt at 80-120•C and then stirred at 300 rpm. 10 g of aluminum hydroxide powder was subsequently added to the reactor, yielding a white slurry after stirring for 10 minutes. The slurry solidified into white lumps after cooling to room temperature. The white lumps were placed in a tank and reheated into white slurry at 100-120•C. The heated slurry was coated on a piece of A4 size paper and then placed in an oven, dried at 60•C for 60 minutes, 80•C for 60 minutes, 100•C for 60 minutes, 120•C for 30 minutes, 140•C for 30 minutes, 160•C for 30 minutes, 180•C for 30 minutes, and finally, molded at 200•C for 240 minutes.

A flame test was conducted on the surface of the sample layer by butane gas torch with flame temperature of 1000-1200•C for 30 seconds to 3 minutes. The result of the burn on the piece of A4 size paper is summarized in Table 1. No scorching was observed on the piece of A4 size paper after heating for 30, 60 and 120 seconds, slight scorching was noticed after 180 seconds According to this example, the duration of the fire resistant ability was more than 3 minutes because the strengthened sample layer, i.e. —COOH of poly(ethylene-co-acrylic acid), reacted with —OH of $Al(OH)_3$ to form chemical bonds rather than physical blending.

EXAMPLE 3

20 g of poly(acrylic acid-co-maleic acid) (50 wt % solid content) was charged in a reactor, preheated at 80-90•C and then stirred at 300 rpm. 10 g of aqueous ammonia was added to the reactor and stirred for 10 minutes. 10 g of aluminum hydroxide powder was subsequently added to the reactor, yielding a yellow slurry after stirring for 10 minutes. A 2 mm-thick slurry was coated on a piece of A4 size paper and then placed in an oven, dried at 60•C for 60 minutes, 80•C for 60 minutes, 100•C for 60 minutes, 120•C for 30 minutes, 140•C for 30 minutes, 160•C for 30 minutes, 180•C for 30 minutes, and finally, molded at 200•C for 240 minutes.

A flame test was conducted on the surface of the sample layer by butane gas torch with flame temperature of 1000-1200•C for 30 seconds to 3 minutes. The result of the burn on the piece of A4 size paper is summarized in Table 1. No scorching was observed on the piece of A4 size paper after heating for 30, 60 and 120 seconds, slight scorching was noticed after 180 second.

According to this example, the duration of fire resistant ability was more than 3 minutes due to the strengthened sample layer, i.e. —COOH of poly(acrylic acid-co-maleic acid) reacted with —OH of $Al(OH)_3$ to form chemical bonds instead of physical blending.

EXAMPLE 4

50 g of reactive polyurethane containing 8% reactive isocyanate groups was charged in a reactor, stirred at 300 rpm. Subsequently, 50 g of aluminum hydroxide powder was added to the reactor, giving a white slurry after stirring for 5 minutes. A 2 mm-thick slurry was coated on a piece of A4 size paper and then dried at room temperature for 24 hours.

A flame test was conducted on the surface of the sample layer by butane gas torch with flame temperature of 1000-1200•C for 30 seconds to 3 minutes. The result of the burn on the piece of A4 size paper is summarized in Table 1. No scorching was observed on the piece of A4 size paper after heating for 30, 60 and 120 seconds, slight scorching was observed after 180 seconds.

According to this example, the duration of fire resistant ability was more than 3 minutes due to the strengthened sample layer, i.e. —NCO of reactive polyurethane reacted with —OH of $Al(OH)_3$ to form chemical bonds rather than physical blending.

EXAMPLE 5

50 g of reactive polyurethane containing 8% reactive isocyanate groups was charged in a reactor, stirred at 300 rpm. Subsequently, 45 g of magnesium hydroxide powder and 5 g of modified nanoclay containing —OH groups (Cloisite 30B from Southern Clay Product Corp.) were added to the reactor, yielding a white slurry after stirring for 5 minutes. A 2 mm-thick slurry was coated on a piece of A4 size paper and then dried at room temperature for 24 hours.

A flame test was conducted on the surface of the sample layer by butane gas torch with flame temperature of 1000-1200•C for 30 seconds to 3 minutes. The result of the burn on the piece of A4 size paper is summarized in Table 1. No scorching was observed on the piece of A4 size paper after heating for 30, 60 and 120 seconds, slight scorching was noticed after 180 seconds.

According to this example, the duration of fire resistant ability was more than 3 minutes due to the strengthened sample layer, i.e. —NCO of reactive polyurethane reacted with —OH of $Mg(OH)_3$ and nanoclay to form chemical bonds rather than physical blending.

EXAMPLE 6

20 g of 3,4-epoxycyclohexyl methyl-3,4-epoxycyclohexane carboxylate (E4221, epoxy resin from Union Carbide)

was charged in a reactor and stirred at 300 rpm, followed by addition of an excess amount (8 g, equivalence ratio of E4221/MeHHPA=1/1.14) of MeHHPA (hexahydro-4-methylphthalic anhydride) as curing agent and 0.1 g of BDMA (N,N-dimethyl benzylamine) as catalyst. After stirring for 5 minutes, 48.1 g of aluminum hydroxide powder was added to the reactor, giving a white slurry after stirring for 10 minutes. A 2 mm-thick slurry was coated on a piece of A4 size paper and then dried at room temperature for 24 hours.

A flame test was conducted on the surface of the sample layer by butane gas torch with flame temperature of 1000-1200•C for 30 seconds to 3 minutes. The result of the burn on the piece of A4 size paper is summarized in Table 1. No scorching was observed on the piece of A4 size paper after heating for 30, and 60 seconds, while it became slightly scorched after heating for 120 seconds, and scorched after heating for 180 seconds.

According to this example, the duration of fire resistance was more than 3 minutes due to the strengthened sample layer, i.e. anhydride groups of epoxy resin (derived from excess MeHHPA) reacted with —OH groups of $Al(OH)_3$ to form chemical bonds rather than physical blending.

EXAMPLE 7

Figure 2:
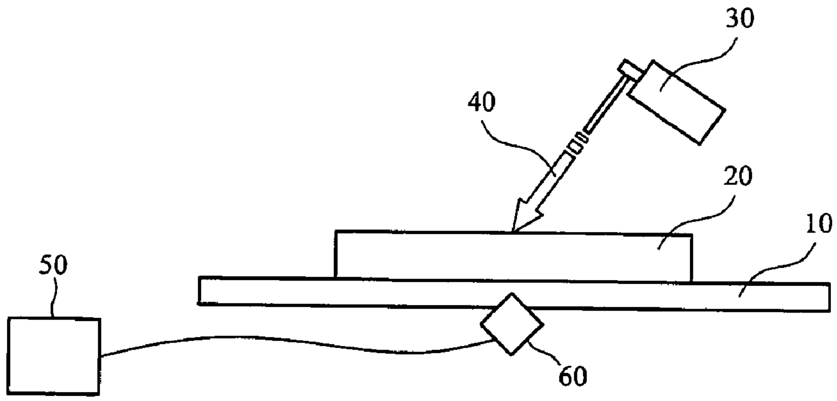
FIG. 2 is a schematic figure demonstrating the temperature measurement of the A4 size paper in Example 7.
Figure 3:
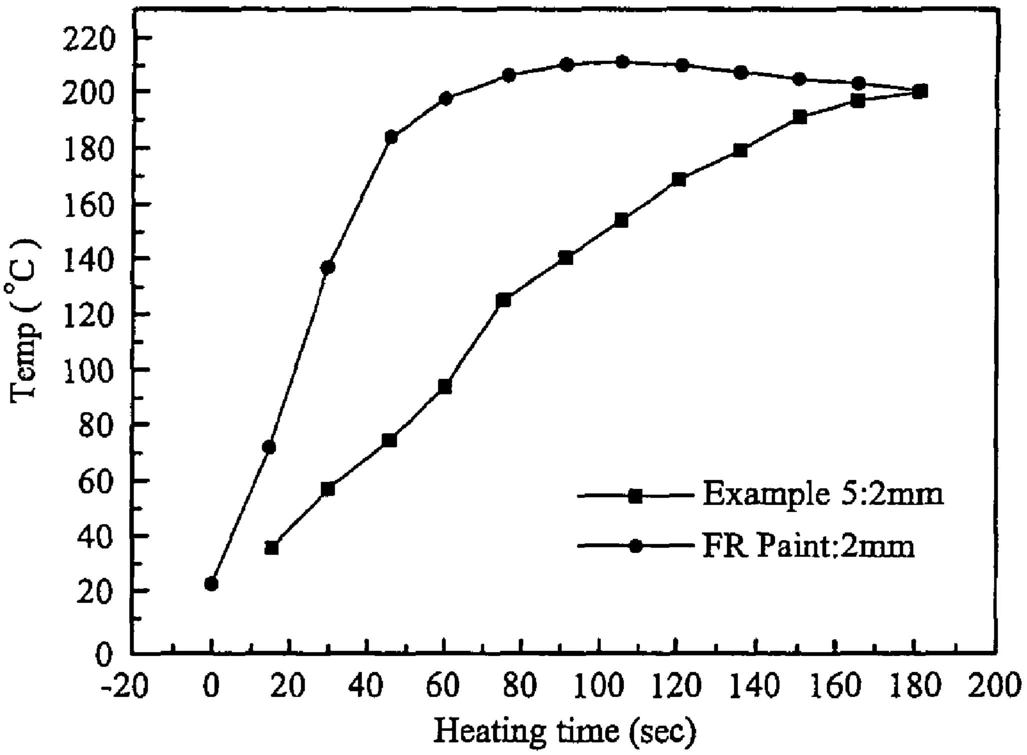
FIG. 3 is a diagram showing the backside temperature of the A4 size paper as a function of heating time, in which the fire-resistant coating material of Example 5 and a commercial fire-resistant coating material are compared.

Referring to FIG. 2, 2 mm-thick slurry of Example 5 was coated on a piece of A4 size paper 10 and then dried at room temperature for 24 hours. A flame test was conducted on the surface of the sample layer 20 by butane gas torch with flame temperature of 1000-1200•C for 180 seconds, where the bottom surface of the A4 size paper 10 was connected to thermocouple 60 of a temperature detector 50 to monitor the temperature rise. A commercial intumescent fire-resistant paint (FM900 from YUNG CHI PAINT & VARNISH MFG. CO., LTD) of 2 mm thickness was subjected to the same flame test. As shown in FIG. 3, the temperature under the commercial intumescent fire-resistant paint increased rapidly to 200•C after heating for 60 seconds. In comparison, the temperature under the sample layer of Example 5 slowly increased to 200•C when heated for 180 seconds.

According to this example, the duration of fire resistant ability was remarkably improved due to the strengthened sample layer, i.e. —NCO of reactive polyurethane reacted with —OH of $Mg(OH)_3$ and nanoclay to form chemical bonds rather than physical blending.

TABLE 1

| Example | Organic polymer | Inorganic particles | Paper states after direct heating at 1000-1200° C. for 30 secs. | 1 min. | 2 mins. | 3 mins. |
|---|---|---|---|---|---|---|
| 1 | poly(ethylene-co-acrylic acid) | $Al(OH)_3$ | unchanged | unchanged | unchanged | Slightly scorched |
| 2 | poly(ethylene-co-acrylic acid) | $Al(OH)_3$ | unchanged | unchanged | unchanged | Slightly scorched |
| 3 | poly(acrylic acid-co-maleic acid) | $Al(OH)_3$ | unchanged | unchanged | unchanged | Slightly scorched |
| 4 | Reactive polyurethane (poly isocyanate) | $Al(OH)_3$ | unchanged | unchanged | unchanged | Slightly scorched |
| 5 | Reactive polyurethane (poly isocyanate) | $Mg(OH)_2$ Clay(OH) | unchanged | unchanged | unchanged | Slightly scorched |
| 6 | E4221/MeHHPA (epoxy/anhydride) | $Al(OH)_3$ | unchanged | unchanged | Slightly scorched | Scorched |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fire-resistant coating material, comprising:
an organic/inorganic composite comprising:
30-70% by weight of an organic component having a first reactive functional group of isocyanate, the organic component comprising polymer, copolymer, monomer, oligomer, or prepolymer; and
70-30% by weight of flame retardant inorganic particles having a second reactive functional group of hydroxyl;
wherein the flame retardant inorganic particles are chemically bonded to the organic component via a reaction between the first and second reactive functional groups;
wherein the flame retardant inorganic particles are metal hydroxide; and
wherein the flame retardant inorganic particles and the organic component are sufficiently bonded to a degree to provide a fire resistance capable of withstanding flame temperatures between 1000 and 1200° C. for more than 3 minutes.

2. The fire-resistant coating material as claimed in claim 1, wherein the organic component comprises polyurethane, or polyolefin copolymer having isocyanate groups.

3. The fire-resistant coating material as claimed in claim 1, wherein the metal hydroxide comprises $Al(OH)_3$ or $Mg(OH)_2$.

4. The fire-resistant coating material as claimed in claim 1, further comprising water or organic solvent.

5. The fire-resistant coating material as claimed in claim 1, further comprising water, pigment, thickener, defoaming agent, surfactant, or combinations thereof.

6. The fire-resistant coating material as claimed in claim 1, further comprising organic solvent, pigment, resin, leveling agent, curing agent, or combinations thereof.

7. The fire-resistant coating material as claimed in claim 1, further comprising flame retardant, silane, siloxane, glass sand, or glass fiber.

8. The fire-resistant coating material as claimed in claim 1, which is used for fire-resistant coating of indoor structures.

9. The fire-resistant coating material as claimed in claim 1, which is used for fire-resistant coating of structural steels.

10. The fire-resistant coating material as claimed in claim 1, which is used for fire-resistant coating of wire wraps or cable wraps.

11. The fire-resistant coating material as claimed in claim 1, which is used for fire-resistant coating of foaming materials.

12. The fire-resistant coating material as claimed in claim 1, which is used for fire-resistant coating of flammable objects in vehicles.

13. A method for making a fire-resistant coating material, comprising:

directly mixing (a) 30-70% by weight of an organic component comprising a polymer, copolymer, or oligomer having a first reactive functional group of isocyanate and (b) 70-30% by weight of flame retardant inorganic particles having a second reactive functional group of hydroxyl for reaction to provide a slurry, such that the flame retardant inorganic particles are chemically bonded to the polymer, copolymer, or oligomer via a reaction between the first and second reactive functional groups;

wherein the flame retardant inorganic particles are metal hydroxide; and wherein the flame retardant inorganic particles and the organic component are sufficiently bonded to a degree to provide a fire resistance capable of withstanding flame temperatures between 1000 and 1200° C. for more than 3 minutes.

14. The method as claimed in claim 13, wherein the organic component comprises polyurethane, or polyolefin copolymer having isocyanate groups.

15. The method as claimed in claim 13, wherein the metal hydroxide comprises $Al(OH)_3$ or $Mg(OH)_2$.

16. The method as claimed in claim 13, further comprising adding solvent or water to the slurry.

* * * * *

UNITED STATES PATENT AND TRADEMARK OFFICE

CERTIFICATE OF CORRECTION

PATENT NO. : 8,329,820 B2
APPLICATION NO. : 11/642634
DATED : December 11, 2012
INVENTOR(S) : Chih-Ming Hu et al.

It is certified that error appears in the above-identified patent and that said Letters Patent is hereby corrected as shown below:

ON THE TITLE PAGE:

At item (30), Foreign Application Priority Data, change:

"Dec. 26, 2005 (TW) .................... 94146508 A"

to --Dec. 26, 2005 (TW) .................... 94146503 A--.

Signed and Sealed this
Twentieth Day of May, 2014

*Michelle K. Lee*

Michelle K. Lee
*Deputy Director of the United States Patent and Trademark Office*